J. C. MOULTON.
SUSPENSION HOOK AND INSECT INSULATOR.

No. 15,982. Patented Oct. 28, 1856.

UNITED STATES PATENT OFFICE.

JOSEPH C. MOULTON, OF FITCHBURG, MASSACHUSETTS.

COMBINED SUSPENSION-HOOK AND INSECT-INSULATOR.

Specification of Letters Patent No. 15,982, dated October 28, 1856.

*To all whom it may concern:*

Be it known that I, JOSEPH C. MOULTON, of Fitchburg, in the county of Worcester and State of Massachusetts, have invented an Improved Article of Manufacture, which I term an "Insulated Center Hook or Rest;" and I do hereby declare that the same is fully described and represented in the following specification and the accompanying drawings, of which—

Figure 1:
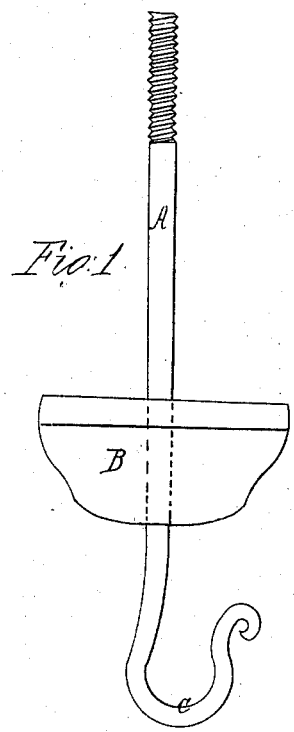
Figure 2:
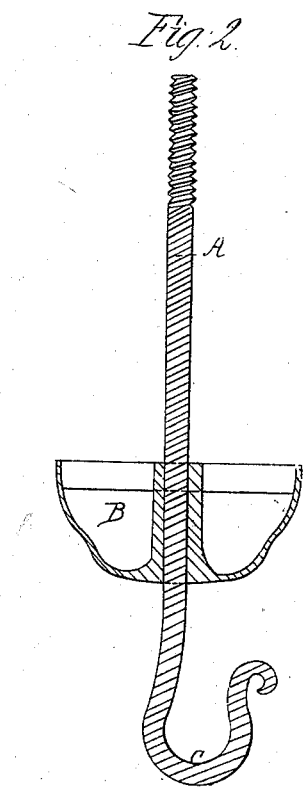

Figure 1, is a side view of such "insulated hook." Fig. 2, a central, vertical and longitudinal section of it.

It consists of three parts, viz, a screw or screw rod A; a cap B, and a suspension hook or supporter, C. The rod extends through the middle of the cup so that it is surrounded by said cup which is suitably formed to receive water or any other fluid and cause it to extend entirely around the screw rod, the hook and the screw being arranged with regard to the cup as seen in the drawings. I would remark however that the positions of the hook and the screw may be reversed in case it may be desirable to so form the article.

Figure 3:
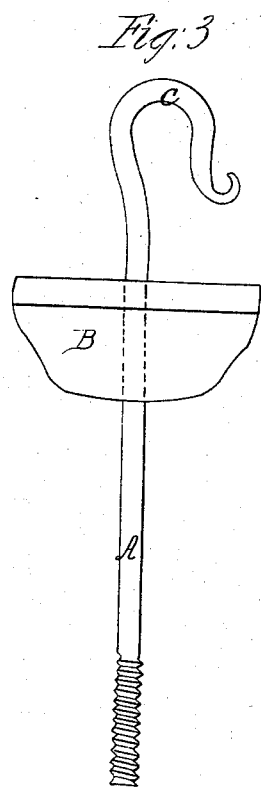

In using the invention, it is intended to insert the screw in a ceiling or other proper place from which it may be desirable to suspend anything whether the same be a joint of meat or other matter, which we may seek to protect from the attacks of ants, or various other insects. In the case, where the hook is placed above the cup, and the screw arranged below it as shown in Fig. 3, the screw may be inserted in the article to be suspended while the hook is passed through a staple (or other means of supporting the same) extended from a ceiling or wall. The particular purpose of my invention is to insulate the article suspended so that insects may not be able by reason of the water, to pass beyond the same.

Now I am fully aware that it is not new to surround a tree, or the foot of a bed-post or a meat safe with a trough or dish for holding a fluid, and therefore I do not claim such, as my invention, although embracing such a principle, still differs therefrom, as it combines with the insulating cup, a screw and a hook or the equivalent thereof for the purpose of attaching one article to another, or of so suspending or isolating it as to protect it from insects as described.

My invention and therefore what I claim is—

A new or improved article of manufacture, composed of a screw rod, cup, and a hook, the whole being arranged and applied together substantially as specified.

In testimony whereof I have hereunto set my signature this twenty first day of March A. D. 1856.

JOSEPH C. MOULTON.

Witnesses:
R. H. EDDY,
F. P. HALE, Jr.